No. 874,068.
PATENTED DEC. 17, 1907.
E. B. HESS.
TYPE WRITING MACHINE.
APPLICATION FILED AUG. 30, 1907.
5 SHEETS—SHEET 2.
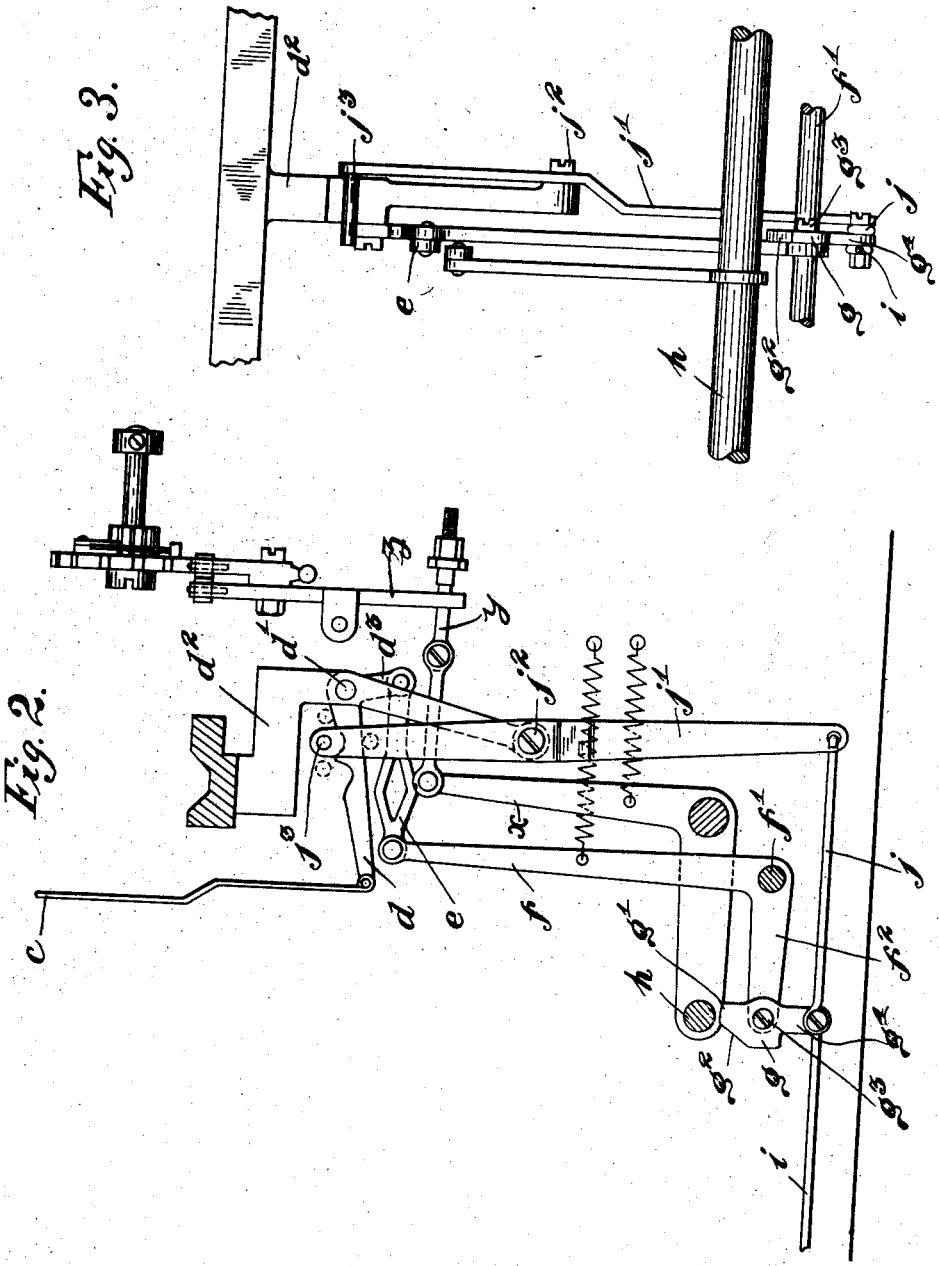
WITNESSES:
INVENTOR
Edward B. Hess
BY
Edward C. Davidson
ATTORNEY

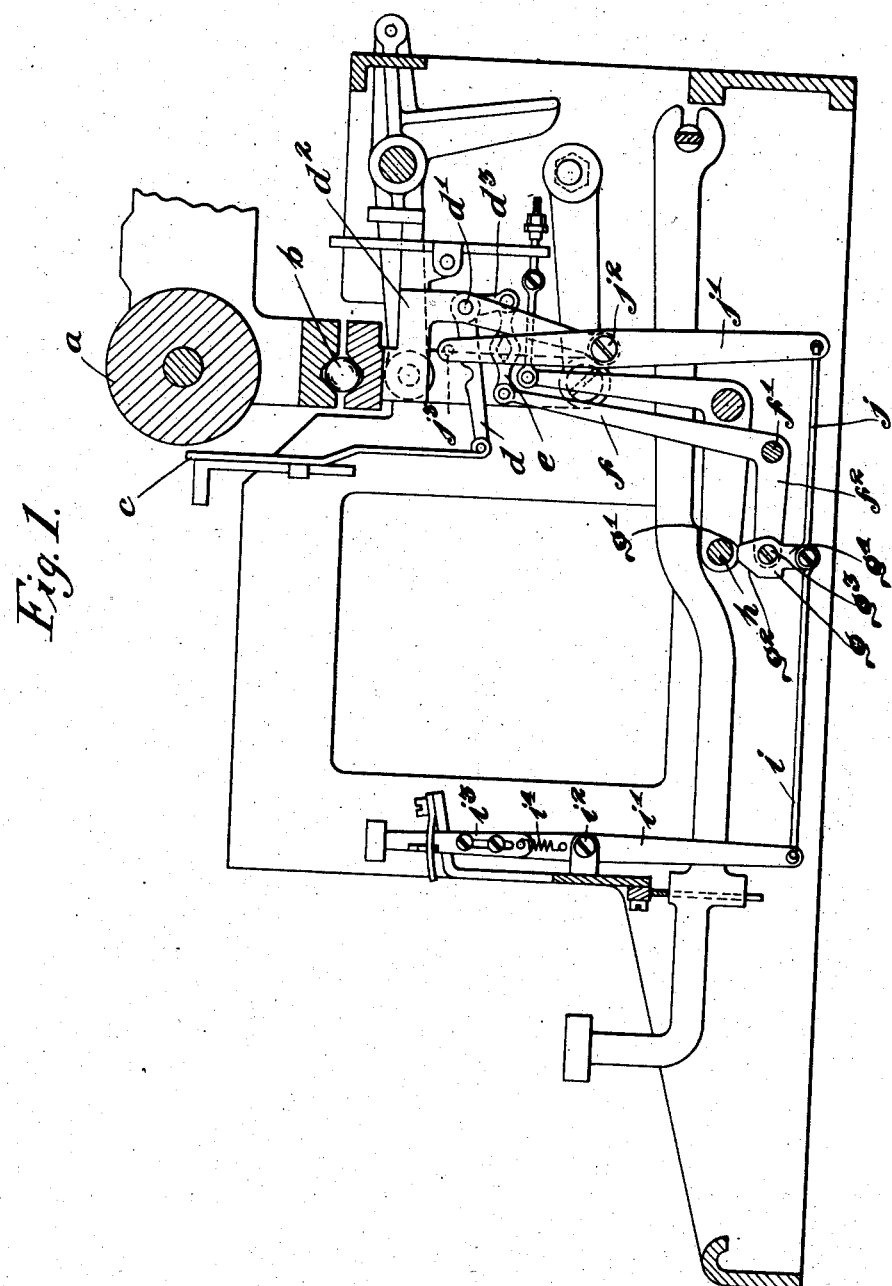

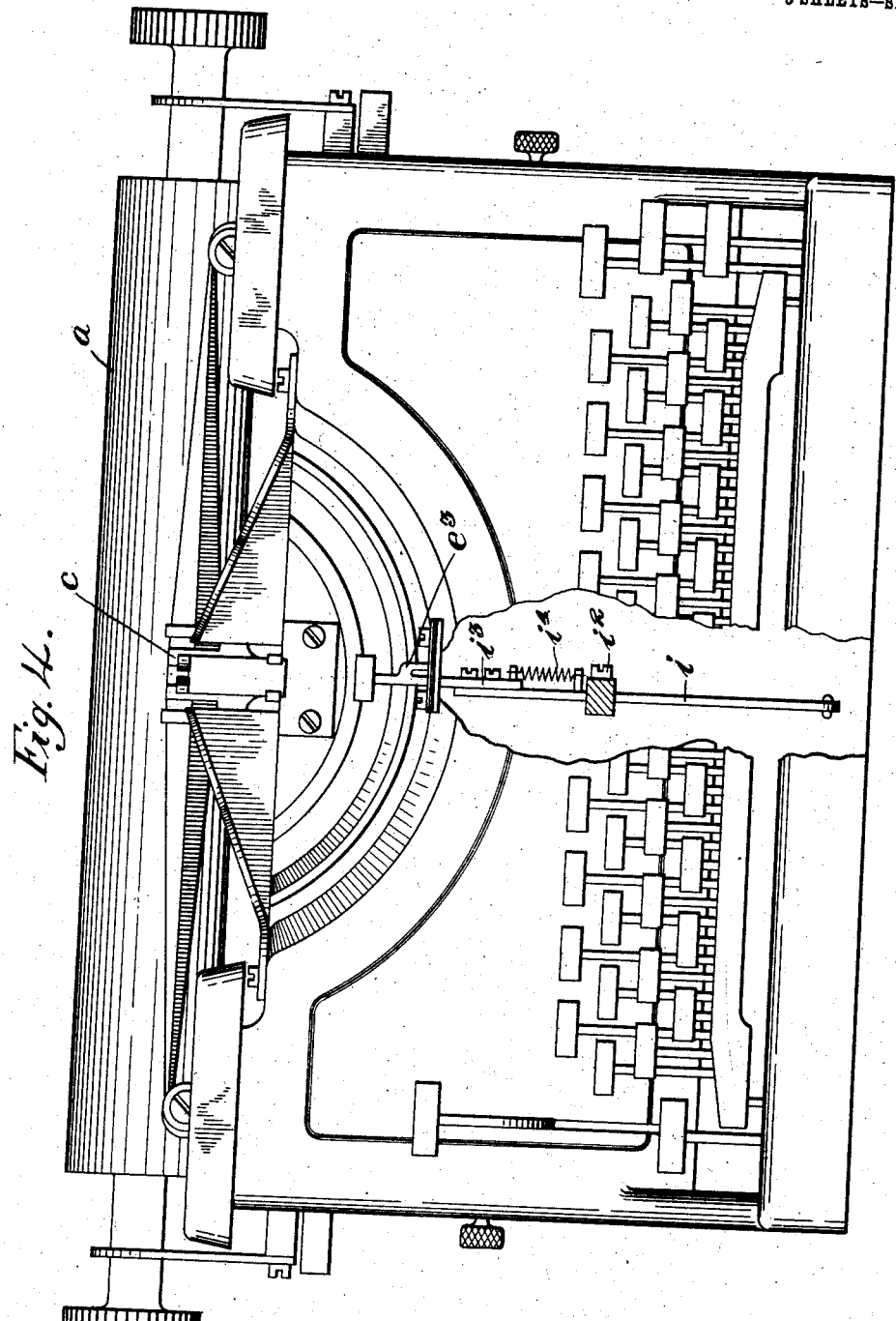

No. 874,068.
PATENTED DEC. 17, 1907.
E. B. HESS.
TYPE WRITING MACHINE.
APPLICATION FILED AUG. 30, 1907.
5 SHEETS—SHEET 4.
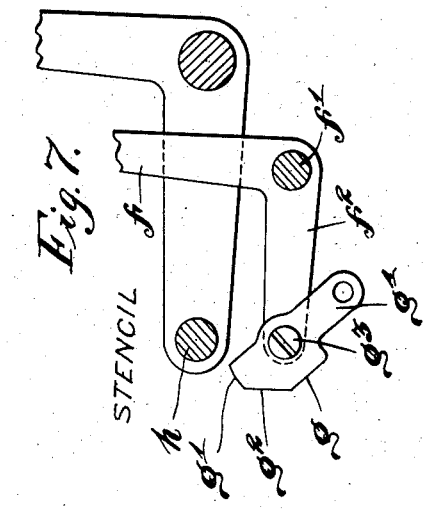
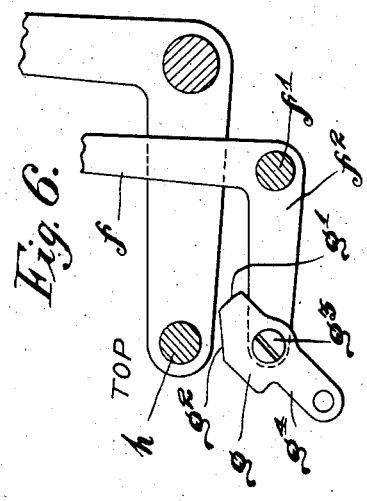
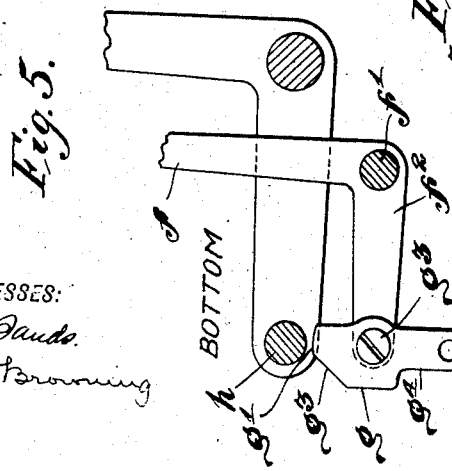
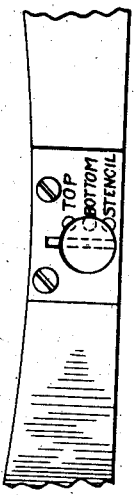
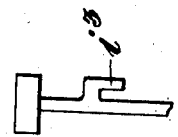
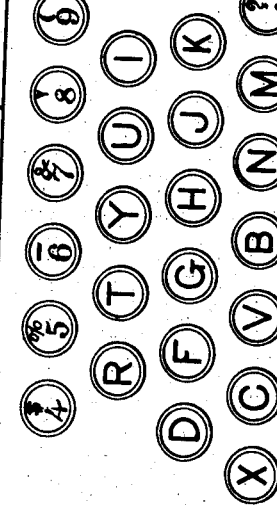
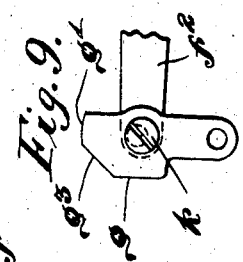
WITNESSES:
INVENTOR
Edward B. Hess
BY Edward C. Davidson
ATTORNEY No. 874,068.
PATENTED DEC. 17, 1907.
E. B. HESS.
TYPE WRITING MACHINE.
APPLICATION FILED AUG. 30, 1907.
5 SHEETS—SHEET 5.
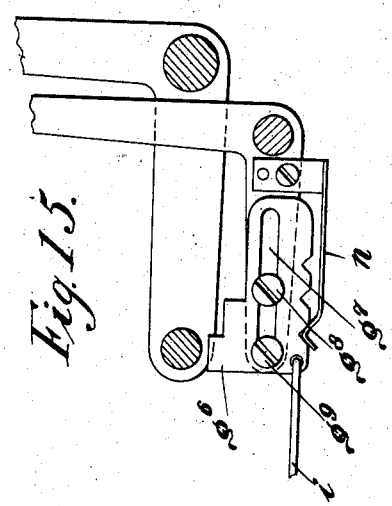
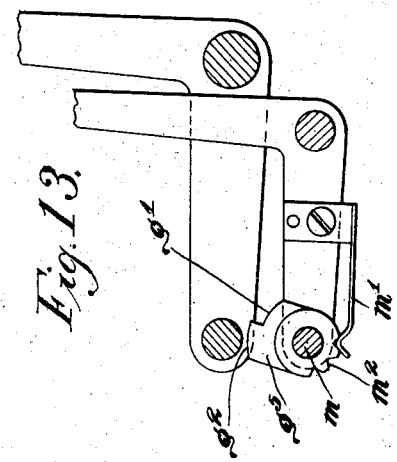
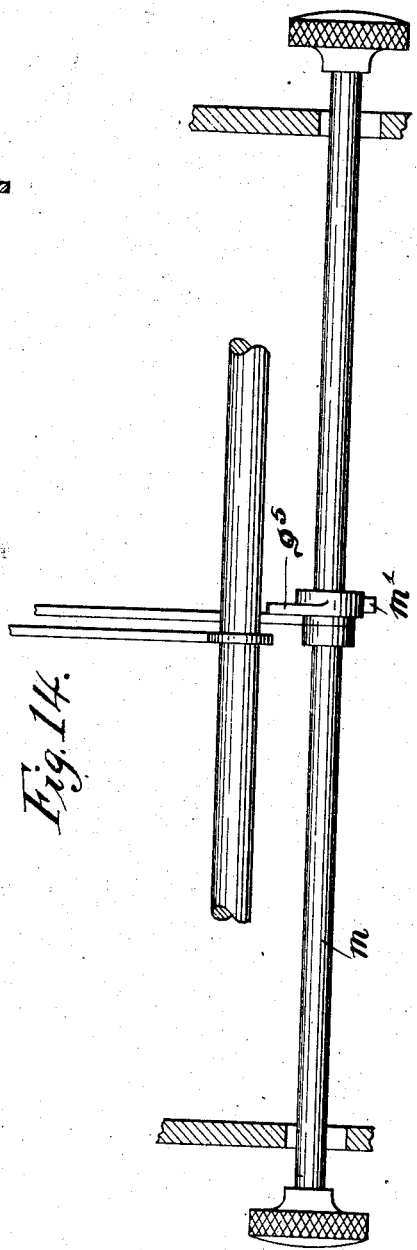
WITNESSES:
INVENTOR
Edward B. Hess
BY
Edward C. Davidson
ATTORNEY

UNITED STATES PATENT OFFICE.

EDWARD B. HESS, OF NEW YORK N. Y., ASSIGNOR TO ROYAL TYPEWRITER COMPANY, OF HOBOKEN, NEW JERSEY, A CORPORATION OF NEW JERSEY.

TYPE-WRITING MACHINE.

No. 874,068.  Specification of Letters Patent.  Patented Dec. 17, 1907.

Application filed August 30, 1907. Serial No. 390,702.

*To all whom it may concern:*

Be it known that I, EDWARD B. HESS, a citizen of the United States of America, residing in the borough of Brooklyn, city and State of New York, have invented certain Improvements in Type-Writing Machines, of which the following is a specification.

This invention relates to improvements in ribbon mechanism, of a visible writing machine and comprises an improved means whereby a variable throw may be imparted to the ribbon vibrator to carry different zones of the ribbon to the printing point.

The invention is particularly designed for use with a ribbon having plural zones of unlike character or color from either of which, at the will of the operator, printing may be effected.

The primary feature of the invention consists in the employment of a part, such as a block or plate, located below and in the path of the universal bar, and having surfaces of different radius, or elevation, which may be, respectively, by means under control of the operator, brought into the path of the universal bar which latter may have a uniform range of depression as is commonly the case in typewriting machines. The movable block is connected by appropriate devices with the ribbon guide or vibrator the extent of movement of which when the key levers are operated will depend upon which one of the surfaces of the block is acted upon by the universal bar.

In the accompanying drawings: Figure 1 is a longitudinal vertical section showing so much of a machine as is deemed desirable to illustrate the invention: Fig. 2, an enlarged detail section showing the ribbon vibrator and the escapement devices: Fig. 3, a front elevation of some of the parts shown in Fig. 2: Fig. 4, a front elevation of the machine partly broken away: Figs. 5, 6 and 7 are enlarged detail views showing respectively the adjustment for printing from the bottom of a ribbon, from the top thereof and for stencil work: Figs. 8, 9 and 10 are detail views showing eccentric adjustments: Fig. 11, a plan view of the central part of the keyboard: Fig. 12, a detail view of a member in the keyboard by means of which the adjustment of the ribbon vibrator devices may be effected: Fig. 13, a detail view similar to Figs. 5, 6 and 7 showing a modification: Fig. 14, a front elevation showing the devices indicated in Fig. 13: and Fig. 15, a detail view similar to Fig. 13 showing a further modification.

The platen $a$ is carried by a shifting carriage which may run upon balls $b$ interposed between the bottom rail of the carriage and the shift rail which later may be operated in any usual way.

$c$ is the ribbon vibrator pivoted at its lower end to the forwardly extending arm $d$ of a bell crank lever pivoted at $d'$ in a downward extension $d^2$ from the carriage shift rail. The downwardly extending arm $d^3$ of this bell crank lever is connected by a forwardly extending link $e$ to the upright arm $f$ of a bell crank lever pivoted in the center of the machine at $f'$ and to the forwardly extending arm $f^2$ of which there is pivoted, as in Figs. 1, 2, 5, 6 and 7, a plate or block $g$ above which lies the ordinary universal bar $h$. The block $g$ has two surfaces of different radius or elevation,—that of greatest elevation being marked $g'$ and the other $g^2$,—and is capable of being so held that either of these surfaces, as will appear particularly from Figs. 5 and 6, may lie directly below the universal bar and in line with the pivot $q^3$ of the block. When the surface $g'$ is in position, as in Fig. 5, to be engaged by the universal bar, the greatest range of movement will be imparted to the ribbon vibrator and the bottom zone of a double zone ribbon will be carried to the printing point. When, as in Fig. 6, the lower surface $g^2$ is in position to be engaged by the universal bar a less range of movement will be imparted to the ribbon vibrator and it should be such that printing will be effected from the top zone of the ribbon. When the block is moved to the position shown in Fig. 7 it will not be engaged by the universal bar and there will be no movement of the lever $f, f'$ and consequently the ribbon vibrator will remain in normal position with all parts of the ribbon below the printing point, or out of range of the type. The block $g$ may be conveniently adjusted and controlled by forming it with an extension $g^4$, projecting below its pivot; and connecting that extension with the rear end of a link $i$, the front end of which is connected with the lower end of a vertically disposed lever $i'$ pivoted on a horizontal axis $i^2$ and having its upper end equipped with a finger piece by which the lever may be rocked longitudinally of the machine. At the side of the lever is an outwardly projecting pin $i^3$ (Fig. 12) adapted to engage either of the apertures marked "Top," "Bottom," "Stencil" in Fig. 11. To provide for extensibility of the lever to permit ready engagement and disengagement with such apertures, it is formed in two parts,—that marked $i'$ and that marked $i^3$, the latter being fitted upon the upper part $i'$ to slide thereon and the two being connected by a coiled spring $i^4$.

To prevent overthrow of the ribbon vibrator when it is moved upwardly, there may be positive stop devices as follows: Extending rearwardly from the block $g$ is a link $j$ to the rear end of which is connected the lower end of a vertically disposed lever $j'$ pivoted at $j^2$ in the end of the part $d^2$ extending down from the shift rail. The upper end of this lever is provided with a lateral pin $j^3$ that extends over the forwardly projecting arm $d$ of the ribbon vibrator operating bell-crank. The upper edge of this arm is appropriately recessed or notched and the pin $j^3$ arranged in such relation thereto that it will positively arrest the ribbon vibrator in its upward movement which is determined by the before described adjustment of block $g$—the lever $i$ being coincidently adjusted by means of the link $j$. As indicated in Figs. 9 and 10, the bearing $g^3$ of the block or part $g$ may be upon an adjustable eccentric screw $k$. This will afford a very delicate and positive adjustment of the surfaces of the block with reference to the universal bar.

In Fig. 13, the ribbon vibrator adjusting block is indicated as a projection $g^5$ from a revoluble shaft $m$ and is provided as before with surfaces $g'$, $g^2$ of different radius or elevation. The shaft $m$ (Fig. 14) may extend transversely of the machine and through the side plates thereof and be provided with knobs. The part $g^5$ is held with sufficient positiveness in the position to which it may be adjusted by a detent spring $m'$ adapted to engage a series of notches $m^2$ in the lower face of the block.

In Fig. 15, the block having surfaces of different elevation engaged by the universal bar is marked $g^6$ and is mounted to slide upon the forwardly extending arm $f^2$ of the bell crank lever, being slotted at $g^7$ and guided by two headed screw bolts $g^8$, $g^9$. It may be adjusted by the link $i$ in the same manner in which the rocking block $g$ is operated. The bottom edge of the sliding block $g^6$ is formed with notches engaged by a detent spring $n$. A vertical adjustment of this block may be afforded by making the guiding screw bolt $g^9$ eccentric as indicated in the sectional view, Fig. 8.

This application relates to special adjustable ribbon vibrator actuating means acting, according to the adjustment thereof, to impart to the vibrator different extents of movement when the universal bar is depressed. The special form of the automatically acting stop devices, herein disclosed, for positively limiting the throw of the vibrator is not claimed herein because it is shown in my application Serial No. 372,465, filed May 8, 1907. Such application No. 372,465, and my earlier application No. 287,489 filed November 15, 1905 which shows another form of automatically acting ribbon vibrator stop devices, both disclose the vibrator stop devices combined with adjustable vibrator actuating means capable, according to the adjustment, of imparting different extents of movement to the vibrator, and therefore such subject matter is not claimed herein. The general arrangement of bell crank levers and connecting link centrally of the machine for operating the ribbon vibrator is shown in both the above mentioned applications, and for that reason is not claimed herein.

The universal bar imparts movement to an upright arm $x$ whose upper end is connected by a link $y$ with the lever $z$, of the carriage escapement devices.

I claim:

1. Ribbon vibrating mechanism for a typewriting machine comprising a ribbon vibrator, a bell crank lever connected to it, a second bell crank lever connected with the first one, a universal bar arranged over the lower arm of the second bell crank lever and an adjustable block carried by said lower arm, located below the universal bar and having surfaces of different elevation adapted respectively to be brought into the path of the universal bar.

2. Ribbon vibrating mechanism for a typewriting machine comprising a ribbon vibrator, a bell crank lever connected to it, a second bell crank lever connected with the first one, a universal bar arranged over the lower arm of the second bell crank lever and an adjustable block acting on said lower arm, located below the universal bar, having surfaces of different elevation adapted respectively to be brought into the path of the universal bar and means within convenient reach of the operator for adjusting said block.

3. Ribbon vibrating mechanism for a typewriting machine comprising a ribbon vibrator, a bell crank lever connected to it, a second bell crank lever connected with the first one, a universal bar arranged over the lower arm of the second bell crank lever, an adjustable block acting on said lower arm, located below the universal bar and having surfaces of different elevation adapted respectively to be brought into the path of the universal bar and stop devices adjusted coincidently with the block and acting upon the bell crank lever to which the ribbon vibrator is attached to positively limit the upward throw of the vibrator.

4. Ribbon vibrator mechanism comprising a universal bar, a ribbon vibrator, an operating connection for the ribbon vibrator extending under the universal bar and located centrally of the machine, a block carried by said operating connection, located under the universal bar and having surfaces of different elevation, an adjusting lever located at the front of the machine and centrally thereof and an operative connection between it and the adjustable block.

5. Ribbon vibrator mechanism comprising a universal bar, a ribbon vibrator, an operating connection for the ribbon vibrator extending under the universal bar and located centrally of the machine, a block carried by said operating connection located under the universal bar and having surfaces of different elevation, an adjusting lever located at the front of the machine and centrally thereof, a link extending rearwardly from said block, a vertically disposed lever to which the link is connected and a stop with which the lever is provided acting upon the operating connection of the ribbon vibrator to positively determine the upward throw of the vibrator.

6. Ribbon vibrating mechanism for a typewriting machine, comprising a universal bar, a ribbon vibrator, an operating connection, located centrally of the machine, for the ribbon vibrator extending under the universal bar and an adjustable block having surfaces of different elevation connected with said connection and lying under the universal bar and means whereby the block may be adjusted to bring either of its operative surfaces into the path of the universal bar.

7. A ribbon vibrating mechanism for a typewriting machine comprising a universal bar, a ribbon vibrator, an adjustable ribbon vibrator actuating block having surfaces of different elevation located below the universal bar and adapted to be acted upon by it and an adjustable eccentric for adjusting the block with reference to the universal bar.

8. A ribbon vibrating mechanism for a typewriting machine comprising a universal bar, a ribbon vibrator, and an adjustable ribbon vibrator actuating block having surfaces of different elevation located below the universal bar and adapted to be acted upon by it.

9. Ribbon vibrating mechanism for a typewriting machine comprising a ribbon vibrator, a bell crank lever connected to it, a second bell crank lever connected with the first one, a universal bar arranged over the lower arm of the second bell crank lever, an adjustable block carried by said lower arm, located below the universal bar and having surfaces of different elevation adapted respectively to be brought into the path of the universal bar and escapement devices actuated during movement of the universal bar.

10. Ribbon vibrating mechanism for a typewriting machine, comprising a universal bar, having a uniform extent of depression, a ribbon vibrator, an operating connection for the ribbon vibrator extending under the universal bar, an adjustable block having surfaces of different elevation connected with said connection and lying under the universal bar and means whereby the block may be adjusted to bring either of its operative surfaces into the path of the universal bar and escapement devices operated by the universal bar during its movement.

In testimony whereof, I have hereunto subscribed my name.

EDWARD B. HESS.

Witnesses:
JOHN M. LEE,
L. F. BROWNING.